United States Patent Office 3,179,524
Patented Apr. 20, 1965

3,179,524
INORGANIC CO-POLYMERIC MATERIALS
AND PROCESS
Donald Noel Hunter, London, England, assignor to Artrite Resins Limited, London, England, a British company
No Drawing. Filed Oct. 28, 1960, Ser. No. 65,593
Claims priority, application Great Britain, Oct. 30, 1959, 36,967/59; June 2, 1960, 19,571/60
19 Claims. (Cl. 106—39)

The invention relates to polymeric materials and in particular to inorganic polymeric materials comprising or based on polyphosphates.

It is known that potassium polymetaphosphate can be obtained in the form of a high molecular weight essentially linear polymer by heating potassium dihydrogen phosphate up to temperatures of 1000° C., and subsequently cooling the melt, when the condensation is completed. Polymeric materials having molecular weights in the region of 1,000,000 can thus be obtained. A high molecular weight potassium polymetaphosphate is commonly referred to as "Kurrol's salt."

We have discovered that if all or part of the potassium atoms in Kurrol's salt are substituted by lithium atoms, a water-soluble lithium polymetaphosphate can be obtained which possesses widely differing properties from the corresponding potassium salt but nevertheless is similarly thermally stable and exhibits no substantial weight loss when heated at temperatures up to 1000° C.

Furthermore, we have discovered that alkali metal polymetaphosphates, and particularly lithium containing polymetaphosphates will react at high temperatures, for example above 200° C., with certain oxides or oxide containing materials.

According to the present invention there is provided a process for preparing inorganic copolymers, which process comprises reacting an alkali metal polymetaphosphate with an oxide of those elements which are lower than phosphorus in the electronegativity scale and also have an atomic volume smaller than that of phosphorus. The electronegativity of oxide forming elements and their atomic volume are to be found in the book by L. Pauling entitled "The Nature of the Chemical Bond," 3rd Edition, 1960, published by Cornell University Press.

Examples of oxides of those elements as defined in the preceding paragraph are:

Magnesium oxide
Aluminium oxide
Zinc oxide
Ferric oxide (calcined)
Magnetic iron oxide
Cobalt oxide
Nickel oxide
Copper oxide
Boron trioxide
Stannous oxide
Titanium dioxide
Zirconium oxide
Molybdenum trioxide In a process according to this invention the oxide may form part of an oxide containing material, the oxide being in a reactive condition. Unless the oxide is present in the oxide containing material in a reactive form the formation of an inorganic copolymer will not take place or only take place to a small extent. However, whether or not an oxide containing material contains an oxide of an element which is lower than phosphorus in the electronegativity scale and also has an atomic volume smaller than phosphorus can readily be determined by heating a mixture of 3 parts by weight of the oxide containing material with 1 part by weight of the alkali metal polymetaphosphate at a temperature in the region of the melting point of the polymetaphosphate; if heating the mixture results in a substantial reduction in the amount of polyphosphate material which can be extracted by boiling water the oxide containing material is one suitable for use in accordance with the invention. Examples of suitable oxide containing materials are:

Asbestos
"Secco" clay
Mikale (china clay)
Fuller's earth
Secar 250 } $(CaAl_2Si_2O_8)$
Ciment Fondu
China clay $(Al_2O_3 \cdot 2SiO_2 \cdot 2H_2O)$ The following materials are examples of those which, when subjected to the simple test described above, have been found not to react polymetaphosphates:

Felspar
Barytes
Rocksil (a mineral wool fiber)
Alusil (colloidal aluminium silicate)
Sillimanite It is preferred to use a macromolecular oxide or oxide containing material such as alumina, particularly corundum, or asbestos or mixtures thereof.

The alkali metal polymetaphosphate may be the sodium or potassium salt, or contain both these ions. It is preferred, however, that a least 5% of the ions of the alkali metal polymetaphosphate are lithium ions, and more preferably that 30% to 50% of the ions are lithium ions.

A lithium containing polymetaphosphate may be prepared from the corresponding sodium or potassium salt by an ion-exchange process, e.g. by use of an ion-exchange resin.

Lithium-containing polymetaphosphates which can be used in the process of the invention may alternatively be prepared by mixing together in the desired proportions powdered lithium polyphosphate containing substantially only lithium cations with either or both potassium polyphophate (i.e. Kurrol salt) or sodium polyphosphate (i.e. sodium hexametaphosphate). Such a mixture may either be fused and then subsequently ground to a powder or alternatively the mixture may be dissolved in water and then dehydrated.

The pure lithium polyphosphate may be prepared by a fusion process comprising neutralising orthophosphoric acid with lithium hydroxide or lithium carbonate and then heating the product to a temperature between 300° and 1100° C., preferably to a temperature about 850° C.

We have found that a polyphosphate containing lithium and at least one other cation has an unexpectedly low softening point, even when thoroughly dry (the presence of a small amount of water decreases the softening point even further as is commonly known; but such water has other undesirable effects when the polyphosphate is employed in a process for preparing heat stable products).

The following Table I illustrates the unexpectedly low softening points which are obtained with mixtures of cations.

TABLE I

| Molar Ratio of Metal in Polyphosphate, percent | | | Softening Point, °C. |
|---|---|---|---|
| Li | Na | K | |
| ------ | ------ | 100 | 807 |
| ------ | 100 | ------ | 627 |
| 100 | ------ | ------ | 380 |
| 50 | ------ | 50 | 360 |
| 33 | 33 | 33 | 350 |
| 50 | 50 | ------ | 330 |

It will be appreciated that mixtures of oxides and/or oxide-containing materails can also be used. The proportion of polyphosphate to oxide or oxide-containing material will depend on the nature of the oxide or oxide-containing material and on the properties desired from the final composition. Use of a low proportion of polyphosphate results in a product which is essentially a copolymer bonded oxide or oxide-containing material and its properties will be mainly those of the oxide or oxide-containing material. Use of a high proportion of polyphosphate results in a product which is a hardened and insolubilized polyphosphate. However, in general it is preferred that the polymetaphosphate is employed in an amount of from 5 to 65% by weight on the weight of the oxide and the polymetaphosphate, and more particularly in amounts from 15 to 40%.

The oxide and the polyphosphate may be mixed together in a finely divided condition before heating to reaction temperatures; however, it is preferred that the alkali metal polymetaphosphate is deposited from solution on to the oxide or an oxide containing material and the resultant product dried to form a reaction mixture prior to heating the reaction mixture to effect the reaction. This may be effected by addition of a water-miscible solvent in which the polyphosphate is insoluble, e.g. acetone, to a suspension of the oxide or oxide containing material in an aqueous solution of an alkali metal polymetaphosphate.

Reaction between the two reactants, the polymetaphosphate and the oxide containing material, may take place in some cases when these reactants are heated to temperatures in excess of 200° C. Firstly the polymetaphosphate begins to melt to give a reactive component, which is probably a part of a molecule, such as a molecule-ion, rather than whole molecules. The oxide or oxide containing material although possessing a much higher melting point, e.g. in the case of alumina a melting point in the region of 1800° to 2000° C., participates in the reaction without attaining its normal melt temperature. Generally the reaction can be effected by heating the reactants to temperatures of from 250° to 450° C., or preferably from 300° to 350° C.

The process for preparing inorganic copolymers described above is particularly suitable for use in a moulding process for preparing moulded articles having good thermal stability, the moulding process being carried out in a mould under moulding pressure. In many cases, moulding techniques similar to those used in processes of moulding phenolic resins may be used, and moulding pressures of the order of 2 tons per square inch have been successfully used. It is generally desirable to use a mould release agent such as a silicone grease. Fillers, such as mica or glass fibres or other fillers having good thermal stability may be used in the moulding processes. It is preferred that the alkali metal polymetaphosphate is a lithium containing polymetaphosphate, the oxide is alumina and the reactants are heated in the mould at a temperature between 300° and 400° C. for a period of from 10 to 20 minutes. A moulded article may be subjected with advantage to a further heating stage at temperatures of from 500° to 700° C. for 1 to 2 hours.

The invention also includes a moulding composition suitable for use in preparing moulded articles having good thermal stability, which composition comprises a mixture of an alkali metal polymetaphosphate and an oxide of those elements which are lower than phosphorus in the electronegativity scale and also have an atomic volume smaller than that of phosphorus.

The products resulting from processes in accordance with the invention have been found to melt at much higher temperatures than the polymetaphosphate used as a starting material. For example, lithium polyphosphates have been prepared in accordance with this invention, which melt within the range of 200 to 300° C. Products resulting from heating lithium polyphosphate and an oxide have been found to melt at much higher temperatures than the original lithium polyphosphate e.g. within the range of from 500 to 1,500° C., depending on the molecular weight of the lithium polyphosphate and upon the particular oxide or oxide-containing material employed.

Following is a description by way of example of processes in accordance with the invention and of methods of making polymetaphosphates to be used in these processes.

Example 1

84.4 grams of lithium chloride was dissolved in 5 litres of distilled water and 118 grams of potassium polyphosphate in the form of the Kurrol salt added with good agitation. A viscous, clear solution was obtained from which polymeric material was precipitated by adding acetone. A transparent elastic gummy mass was obtained, which was dried in a vacuum 50°–60° C. after squeezing out as much of the mother liquor as possible.

The product was a tough, translucent "horny" mass, melting at 215° C. to a viscous fluid which solidified again on cooling.

Example 2

500 grams of ion exchange resin sold under the trade name of Zeo-Karb 225 and consisting of sulphonated cross-linked polystyrene was agitated in free acid form, with 5 litres of distilled water, and neutralized with 1 mol. equivalent lithium hydroxide, forming the lithium salt of the ion exchange resin. A mole equivalent of potassium polyphosphate was added to the suspension of resin with good agitation. When the exchange was complete, the Zeo-Karb 225 was filtered off from the resulting solution and the lithium polyphosphate precipitated by the addition of a little sodium sulphate and acetone. Instead of the sodium sulphate employed in the precipitation, lithium chloride could also be used resulting in higher yields. Mother liquor was expelled from the resulting elastic mass by squeezing, and the product was dried in a vacuum at 50–60° C., yielding a tough, translucent "horny" mass, which melted at 208° C.

Example 3

128 grams of lithium sulphate ($Li_2SO_4H_2O$) were dissolved in 5 litres of distilled water and 118 grams of potassium polyphosphate in the form of the Kurrol salt added, with good agitation. When the polyphosphate had all passed into solution in the form of the lithium salt, 85 grams of asbestos "flock" was added and after the asbestos was thoroughly impregnated, lithium polyphosphate was precipitated on to the asbestos by the addition of acetone. The product was squeezed in order to remove as much of the mother liquor as possible, and dried in a vacuum.

The material was shredded into a form suitable for filling a mould, and moulded into various shapes in compression moulding apparatus at pressures of 1–2 tons per square inch, and a temperature of 240–300° C. The mouldings were found to be stable up to the limiting temperature stability of the contained asbestos, and unaffected by water.

Example 4

Lithium polyphosphate was prepared according to the method described in Example 2. Prior to precipitation, 85 grams of finely divided aluminum oxide were added and the polyphosphate precipitated on to the resulting suspension. The white, elastic dough was squeezed to expel mother liquor and dried in a vacuum at 50–60° C.

The product was coated on to mild steel surfaces and after heating for a period of 2–3 minutes at 300° C., the coating set hard to give a strongly adherent refractory finish which was unaffected by the full force of a Bunsen flame, and removable only by the application of a cold chisel. A coating produced from lithium polyphosphate and aluminum oxide and subsequently stoved at temperatures of 300° to 500° C. showed no appreciable loss in weight after prolonged immersion in boiling water.

Example 5

Lithium polyphosphate was prepared according to the method described in Example 1. 100 g. of the product was redissolved in water and mixed with 100 g. of silica powder. The polyphosphate was then precipitated on to the silica, by the addition of acetone and the resultant "dough" dried in a vacuum at 50–60° C. A sample of this material was punch molded at 600° C. in equipment normally used for ceramic moulding, to yield a cylinder which conformed very accurately to the mould dimensions and exhibited no distortion at temperatures up to 1,200° C.

Example 6

A lithium polyphosphate glass was prepared by adding 90 grams of lithium hydroxide to 222 grams of orthophosphoric acid over a period of approximately 1 hour, with good agitation. The heat of neutralisation was used to maintain the reaction mixture in the region of 100° C. and prevent the formation of too much solid. The reaction product was heated for 5 hours at 160° C., to remove the bulk of water in the melt, then the temperature was maintained at 800° to 850° C. for 3 hours. The resultant melt was poured on to a stainless steel plate and yielded a clear glass-like material.

1 part of this material was ground with 2 parts of alpha alumina and moulded at a temperature of 400° C. for 15 minutes, and 1 ton per square inch pressure. The resultant moulding was not affected by boiling water and did not distort at temperatures up to 700° C.

Example 7

A lithium polyphosphate glass-like material, was prepared as in the previous example. This material was ground and mixed with equimolecular quantities of a ground potassium polyphosphate (Kurrol salt) and ground sodium polyphosphate (sodium hexametaphosphate); the mixture was fused to a clear melt, cast, allowed to cool and ground to a fine size. This ground material was then dry mixed with three times its weight of fine mesh alpha alumina; this composition was moulded for 15 minutes at 350° C. and at 2 ton per square inch pressure, resulting in a strong moulding which was unaffected by boiling water.

Example 8

100 parts by weight of a lithium polyphosphate glass-like material as prepared in Example 6 were agitated with 100 parts of potassium polyphosphate in 300 parts of water. Interchange of ion took place as the solid material passed into solution. To this viscous solution was added 100 parts of alpha alumina and 100 parts asbestos powder, the resultant mass being dried under reduced pressure. Moulding at 350° C. to 400° C. for eighteen minutes and 2 ton per square inch pressure resulted in strong mouldings which were unaffected by water.

Example 9

A solution of lithium/potassium polymetaphosphate was prepared by an ion-exchange method. Prior to precipitation of the polyphosphate fine alumina powder was stirred into the solution in an amount equal to 3 times the weight of the polyphosphate present in the solution. The polyphosphate was precipitated onto the alumina in suspension by adding acetone to the stirred solution. The white elastic dough was squeezed to expel mother liquor and dried in vacuum at 50–60° C.

The product was ground to a coarse powder and pressed in a disc mould under 2 tons/in.² at 350° C. platen temperature for 15 minutes. The resulting discs were found to be substantially insoluble in boiling water, had a punch shear strength of 24,000 p.s.i. and a disc tensile strength of 4,500 p.s.i. Further mouldings showed that the product had a flexural strength of 10,000 p.s.i. Mouldings retained their strength up to at least 450° C.

Example 10

The procedure of Example 9 was followed except that 2 parts by weight china clay to 1 part by weight polyphosphate were employed. An insoluble moulding having a punch shear strength of 6,000 p.s.i. was obtained.

Example 11

The general procedure of Example 9 was followed except that 2 parts by weigh of calcium alumina silicate to 1 part by weight polyphosphate were employed. An insoluble moulding having a punch shear strength of 13,300 p.s.i. was obtained.

Example 12

The general procedure of Example 9 was followed except that 2 parts by weight of zinc oxide to 1 part by weight of polyphosphate were employed. An insoluble moulding having a punch shear strength of 5,840 p.s.i. was obtained.

Example 13

The general procedure of Example 9 was followed except that 2 parts by weight of magnetic iron oxide to 1 part by weight of polyphosphate were employed. A moulding which was insoluble, attracted by a magnet and possessed a punch shear strength of 2,520 p.s.i. was obtained.

Example 14

A moulding process was carried out by heating in a mould 1 part of sodium trimetaphosphate and 3 parts by weight of alumina. The moulding composition possessed little flow, but had a punch shear strength of 18,250 p.s.i.

Example 15

A lithium containing polymetaphosphate having 35% of its ions as lithium was prepared from a potassium Kurrol salt. The polyphosphate was precipitated from aqueous solution by addition of acetone and the polyphosphate dried and ground. A moulded article was prepared from 1 part of the polyphosphate and 3 parts of asbestos fibre, the reaction taking place at 360° C. Heating was continued for 15 minutes.

Example 16

A lithium/potassium polymetaphosphate material was prepared by dissolving lithium polyphosphate glass and potassium Kurrol's salt in water. The polyphosphate was precipitated upon 4 parts of alumina per part by weight of polyphosphate by the addition of acetone. The product was dried and moulded at 360° C. for 20 minutes to give a moulded article having a punch shear strength of 7,100 p.s.i.

Example 17

10 parts by weight of aluminium oxide were mixed with 6 parts of sodium metaphosphate glass and heated at 850° C. for 4 hours.

The product was cooled and ground for 48 hours in 50 parts of xylene using a ball mill.

This dispersion was sprayed or brush-coated on to various substrates, e.g. stainless steel, and sintered at 750° to 800° C., to yield a hard uniform protective surface.

Example 18

1 part by weight of lithium containing 30% Li and 70% Na polymetaphosphate was precipitated on to 4 parts of silica flour (200 to 300 mesh) by the addition of acetone. The product was vacuum dried at 60° C. and subsequently moulded into a cylinder 1″ diam., 1½″ long in a graphite die heated to 600° C. for 30 minutes. The final moulding was strong, essentially non-porous, and unaffected by water.

Silica, it has been noted, is not as reactive as the other oxides of this invention and generally requires temperatures in the region of 600° C. before substantially complete reaction takes place.

*Example 19*

A mixture of 3 parts by weight of an alumina mixture containing 70% of alumina of substantially 200 mesh size and 30% of a superfine grade of alumina having a surface factor of 13,500 cm.$^2$/g. and 1 part by weight lithium containing (30% Li–70% K) polymetaphosphate was prepared by the deposition technique. The mixture was moulded into a bar by heating at 360° C. for 15 minutes. The bar was found to possess a mean flexural strength of 11,400 p.s.i.

A series of similar mouldings were tested at a series of temperatures up to 400° C. and these showed no loss in strength. The results of these tests are given in the following table.

| Thickness | Load, lb. | Temperature, ° C. | Flex. St., p.s.i. |
|---|---|---|---|
| 0.116″ | 27 | 50 | 6,010 |
| 0.116″ | 27 | 250 | 6,010 |
| 0.115″ | 27 | 350 | 6,100 |
| 0.133″ | 37 | 400 | 6,300 |

The lithium containing polymetaphosphates prepared as hereinbefore described have been found to possess good adhesion properties and will adhere to a wide variety of substrata and have the ability to form tough, homogeneous glass-like bodies. The reaction products of lithium polyphosphate and the oxides as produced by the processes described in the above examples have been found to possess useful structural properties and thermally and electrically insulating properties and such reaction products can be employed in the fabrication, for example by moulding techniques, of various shaped objects. These reaction products may also be employed in the manufacture of insulating coatings on metal objects and also for the bonding together of various materials, particularly metals.

I claim:

1. A process for preparing inorganic copolymers, which process comprises heating to a temperature between 200 and 600° C. a mixture of a linear lithium polymetaphosphate and a finely divided oxide of an element which is lower than phosphorus in the electronegativity scale and also has an atomic volume smaller than that of phosphorus until a coherent mass of inorganic copolymer is obtained, said oxide being capable of forming a mixture substantially insoluble in boiling water when heated with said polymetaphosphate at about the melting point of the polymetaphosphate.

2. A process as claimed in claim 1 wherein the polymetaphosphate is employed in an amount of from 5 to 65% by weight on the weight of the oxide and the polymetaphosphate.

3. A process as claimed in claim 2 wherein the polymetaphosphate is employed in an amount of from 15 to 40%.

4. A process as claimed in claim 1 wherein the linear lithium polymetaphosphate is deposited from solution on to said oxide and the resultant product dried to form a reaction mixture prior to heating the reaction mixture to effect the reaction.

5. A process as claimed in claim 4 wherein the linear lithium polymetaphosphate is deposited on to the oxide by precipitation from aqueous solution by the addition of acetone.

6. A process as claimed in claim 1 wherein the polymetaphosphate is a lithium containing polymetaphosphate prepared from a high molecular weight Kurrol salt.

7. A process as claimed in claim 1 wherein the reaction is effected by heating the reactants to a temperature of from 250° to 450° C.

8. A process as claimed in claim 7 wherein the reaction temperature is from 300° to 350° C.

9. A moulding composition suitable for use in preparing moulded articles having good thermal stability, which composition consists essentially of a mixture of a linear alkali metal polymetaphosphate and a finely divided oxide of an element which is lower than phosphorus in the electronegativity scale and also has an atomic volume smaller than that of phosphorus.

10. A composition as claimed in claim 9 wherein at least 5% of the ions of the alkali metal polymetaphosphate are lithium ions.

11. A composition as claimed in claim 10 wherein from 30% to 50% of the ions of the alkali metal polymetaphosphate are lithium ions.

12. A composition as claimed in claim 9 wherein the alkali metal polymetaphosphate is present in an amount of from 5 to 65% by weight on the weight of the oxide and the polymetaphosphate.

13. A composition as claimed in claim 12 wherein the alkali metal phosphate is present in an amount of from 15 to 40%.

14. A composition as claimed in claim 9 wherein the linear alkali metal polymetaphosphate is a deposit on the oxide forming a reaction mixture which may be reacted upon heating.

15. A process as claimed in claim 1 wherein the oxide is selected from the group consisting of magnesium oxide, aluminum oxide, zinc oxide, ferric oxide (calcined), magnetic iron oxide, cobalt oxide, nickel oxide, copper oxide, boron trioxide, stannous oxide, titanium dioxide, zirconium oxide and molybdenum trioxide.

16. A process as claimed in claim 1 when carried out in a mould under moulding pressure.

17. A process as claimed in claim 16 wherein the linear alkali metal polymetaphosphate is a lithium containing polymetaphosphate, the oxide is alumina, and the mixture is heated in the mould at a temperature of from 300° C. to 400° C. for a period of from 10 to 20 minutes.

18. A process as claimed in claim 17 wherein the resulting moulded inorganic copolymer is subjected to a further heating stage at a temperature of from 500° C. to 700° C. for a period of from 1 to 2 hours.

19. A moulding composition as claimed in claim 9 wherein the oxide is selected from the group consisting of magnesium oxide, aluminum oxide, zinc oxide, ferric oxide (calcined), magnetic iron oxide, cobalt oxide, nickel oxide, copper oxide, boron trioxide, stannous oxide, titanium dioxide, zirconium oxide and molybdenum trioxide.

References Cited by the Examiner

UNITED STATES PATENTS

| | | | |
|---|---|---|---|
| 1,929,443 | 10/33 | Milligan | 23—107 |
| 1,956,515 | 4/34 | Hall | 23—106 |
| 2,105,446 | 1/38 | Wilson | 23—106 |
| 2,130,557 | 9/38 | Munter | 23—106 |
| 2,414,742 | 1/47 | Jackson | 106—48 |
| 2,608,490 | 8/52 | Donahey | 106—48 |
| 3,057,740 | 10/62 | Skoning | 106—286 |

FOREIGN PATENTS 128,992   1/60   Russia.

TOBIAS E. LEVOW, *Primary Examiner.*

MAURICE A. BRINDISI, *Examiner.*